(12) United States Patent
Wu

(10) Patent No.: US 10,809,576 B2
(45) Date of Patent: Oct. 20, 2020

(54) DISPLAY PANEL, DISPLAY DEVICE, AND METHOD FOR MANUFACTURING DISPLAY PANEL

(71) Applicants: CHONGQING HKC OPTOELECTRONICS TECHNOLOGY CO., LTD., Chongqing (CN); HKC CORPORATION LIMITED, Shenzhen, Guangdong (CN)

(72) Inventor: Chuan Wu, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 47 days.

(21) Appl. No.: 16/312,836

(22) PCT Filed: Nov. 2, 2018

(86) PCT No.: PCT/CN2018/113749
§ 371 (c)(1),
(2) Date: Dec. 21, 2018

(87) PCT Pub. No.: WO2020/062440
PCT Pub. Date: Apr. 2, 2020

(65) Prior Publication Data
US 2020/0103685 A1  Apr. 2, 2020

(30) Foreign Application Priority Data
Sep. 30, 2018  (CN) .......................... 2018 1 1155554

(51) Int. Cl.
*G02F 1/1339* (2006.01)
*G02F 1/13357* (2006.01)
(Continued)

(52) U.S. Cl.
CPC .......... *G02F 1/1339* (2013.01); *G02F 1/1336* (2013.01); *G02F 1/1345* (2013.01); *G02F 1/133784* (2013.01)

(58) Field of Classification Search
CPC ............... G02F 1/1339; G02F 1/13392; G02F 1/13394; G02F 1/1341; G02F 2001/13396;
(Continued)

(56) References Cited

U.S. PATENT DOCUMENTS

2002/0122143 A1* 9/2002 Woo .................... G02F 1/13458
349/42
2004/0135941 A1* 7/2004 Nam ................. G02F 1/133512
349/110

(Continued)

FOREIGN PATENT DOCUMENTS

CN  1560689 A  1/2005
CN  101349849 A  1/2009
(Continued)

OTHER PUBLICATIONS

International Search Report, Jul. 8, 2019, for Chongqing HKC Optoelectronics Technology Co., Ltd., et al., International Application No. PCT/CN2018/113749, Filed Nov. 2, 2018.
(Continued)

*Primary Examiner* — Shan Liu
(74) *Attorney, Agent, or Firm* — Law Offices of Albert Wai-Kit Chan, PLLC

(57) ABSTRACT

A display panel, including: a first substrate, a second substrate, and a seal; the first substrate is provided with a first hollowed-out area, the second substrate is provided with a second hollowed-out area, and a width of the first hollowed-out area and a width of the second hollowed-out area is respectively configured to greater than a width of the seal.

8 Claims, 4 Drawing Sheets

(51) Int. Cl.
  *G02F 1/1337* (2006.01)
  *G02F 1/1345* (2006.01)

(58) Field of Classification Search
  CPC . G02F 2001/13398; G02F 2001/13415; G02F 1/0107; G02F 1/161; G02F 1/1345; G02F 1/1336; G02F 1/133784
  USPC .......................................... 349/153–154, 190
  See application file for complete search history.

(56) References Cited

U.S. PATENT DOCUMENTS

| | | | | |
|---|---|---|---|---|
| 2006/0221291 | A1* | 10/2006 | Hong | G02F 1/1341 349/153 |
| 2010/0157231 | A1* | 6/2010 | Jung | G02F 1/1345 349/143 |
| 2011/0117804 | A1* | 5/2011 | Huang | G02F 1/1339 445/25 |
| 2017/0146834 | A1* | 5/2017 | Tak | G02F 1/133514 |
| 2017/0307921 | A1* | 10/2017 | Feng | H01L 29/78603 |
| 2018/0046043 | A1* | 2/2018 | Anjo | G02F 1/136286 |

FOREIGN PATENT DOCUMENTS

| | | |
|---|---|---|
| CN | 101699335 A | 4/2010 |
| CN | 104360523 A | 2/2015 |
| CN | 105446031 A | 3/2016 |
| CN | 106462018 A | 2/2017 |
| CN | 107450213 A | 12/2017 |
| CN | 107644889 A | 1/2018 |
| CN | 108254979 A | 7/2018 |
| CN | 108267882 A | 7/2018 |
| CN | 109061955 A | 12/2018 |

OTHER PUBLICATIONS

Office Action, dated Feb. 27, 2020, for Chongqing HKC Optoelectronics Technology Co., Ltd., et al., Chinese Patent Application No. 201811155554.3, Filed Sep. 30, 2018.

* cited by examiner

DISPLAY PANEL, DISPLAY DEVICE, AND METHOD FOR MANUFACTURING DISPLAY PANEL

CROSS-REFERENCE TO RELATED APPLICATIONS

This application is the International Application No. PCT/CN2018/113749 for entry into US national phase, with an international filing date of Nov. 2, 2018 designating the U.S., and claims priority benefits to Chinese Patent Application No. 201811155554.3, filed on Sep. 30, 2018, the contents of which being incorporated herein by reference.

BACKGROUND OF THE INVENTION

Field of the Invention

The present application relates to the technical field of display panel manufacturing, and more particularly to a display panel, a display device, and a method for manufacturing a display panel.

Description of Related Art

At present, a display device is generally composed of a display panel, a backlight mounted at a back of the display panel, and a drive loop connected with the display panel.

The display panel is constituted by bonding a TFT (Thin Film Transistor) array substrate and a color film substrate via a seal and then filling the liquid crystal in the middle thereof, in this way, the quality of the seal applying directly affects the quality of the display panel, if the seal applying is too wide, the bonding process of the array substrate and the color film substrate tends to cause the seal to overflow; if the seal applying is too narrow, the seal may be broken to cause liquid crystal to overflow the during the process of vacuuming or long-term use, therefore the detection of a width of the seal is very important; however, since the array substrate is provided with metal wires, the detection signal of the detection device is interfered or blocked by the metal wires, and cannot pass through the metal wires, and the boundary of the seal unable to be detected by the detection device, that is, the width of the seal cannot be accurately detected, and the quality of the display panel cannot be controlled, and the yield of the product is reduced.

BRIEF SUMMARY OF THE INVENTION

An object of the present application is to provide a display panel, including but not limited to solve the technical problem that the width of the seal cannot be accurately detected due to the affecting of the metal wires.

Technical Solutions

In order to solve the above technical problem, the technical solution is adopted by the present application as follow:

A display panel, including:
a first substrate;
a second substrate, configured to dispose opposite to the first substrate and spaced apart from the first substrate to form a gap; and
a seal, configured to be filled in the gap;
in which the first substrate includes:
a glass substrate;
a first metal layer, provided with a first hollowed-out area, and the first hollowed-out area is overlapped with a vertical projection area of the seal and configured for allowing a detection light to pass through;
a gate insulation layer;
a second metal layer, provided with a second hollowed-out area, the second hollowed-out area is overlapped with a vertical projection area of the seal and configured for allowing a detection light to pass through, and a width of the first hollowed-out area and a width of the second hollowed-out area is respectively configured to greater than a width of the seal;
a passivation layer, the first metal layer, the gate insulation layer, the second metal layer, and the passivation layer are sequentially arranged from a side where the glass substrate is located to a side where the gap is located.

In an embodiment, in which the first substrate further includes:
a first transparency conduction layer, configured to connect with portions of the first metal layer corresponding to opposite sides of the first hollowed-out area; and
a second transparency conduction layer, configured to connect with portions of the second metal layer corresponding to opposite sides of the second hollowed-out area.

In an embodiment, the first transparency conduction layer is arranged between the glass substrate and the gate insulation layer, and the first transparency conduction layer covers the first hollowed-out area.

In an embodiment, the second transparency conduction layer is arranged between the gate insulation layer and the passivation layer, and the second transparency conduction layer covers the second hollowed-out area.

In an embodiment, the second transparency conduction layer is arranged between the passivation layer and the seal, the passivation layer is provided with a contact hole configured for allowing the second transparency conduction layer to pass through, and opposite side edges of the second transparency conduction layer respectively pass through the contract hole to connect with the second metal layer.

In an embodiment, the first transparency conduction layer and the second transparency conduction layer are respectively a nano-indium tin metal oxide thin film layer.

In an embodiment, a thickness of the first transparency conduction layer and a thickness of the second transparency conduction layer are respectively 100 to 10000 angstroms.

The display panel provided by the embodiment of the present application has the beneficial effects that the first metal layer and the second metal layer are respectively provided with a first hollowed-out area and a second hollowed-out area, the detection light emitted by the detector can be smoothly passed through the array substrate to detect the boundary of the seal during the width of the seal needs to be detected, the width of the seal can be accurately detected, and the technical problem that the width of the seal cannot be accurately detected due to the affecting of the metal wires can be effectively solved, the accuracy of the detection of the seal is improved, and the yield of the display panel is ensured.

Another object of the present application is to provide a display device, including:
a display panel;
a backlight module, configured to provide illumination for the display panel;
in which, the display panel includes:
a first substrate;

a second substrate, configured to dispose opposite to the first substrate and spaced apart from the first substrate to form a gap; and a seal, configured to be filled in the gap;

in which the first substrate includes:

a glass substrate;

a first metal layer, provided with a first hollowed-out area, and the first hollowed-out area is overlapped with a vertical projection area of the seal and configured for allowing a detection light to pass through;

a gate insulation layer;

a second metal layer, provided with a second hollowed-out area, the second hollowed-out area is overlapped with a vertical projection area of the seal and configured for allowing a detection light to pass through, and a width of the first hollowed-out area and a width of the second hollowed-out area is respectively configured to greater than a width of the seal;

a passivation layer, the first metal layer, the gate insulation layer, the second metal layer, and the passivation layer are sequentially arranged from a side where the glass substrate is located to a side where the gap is located.

In an embodiment, in which the first substrate further includes:

a first transparency conduction layer, configured to connect with portions of the first metal layer corresponding to opposite sides of the first hollowed-out area; and a second transparency conduction layer, configured to connect with portions of the second metal layer corresponding to opposite sides of the second hollowed-out area.

In an embodiment, the first transparency conduction layer is arranged between the glass substrate and the gate insulation layer, and the first transparency conduction layer covers the first hollowed-out area.

In an embodiment, the second transparency conduction layer is arranged between the gate insulation layer and the passivation layer, and the second transparency conduction layer covers the second hollowed-out area.

In an embodiment, the second transparency conduction layer is arranged between the passivation layer and the seal, the passivation layer is provided with a contact hole configured for allowing the second transparency conduction layer to pass through, and opposite side edges of the second transparency conduction layer respectively pass through the contract hole to connect with the second metal layer.

The display device provided by the embodiment of the present application has the beneficial effects that the display panel is adopted, and the first hollowed-out area is covered by the first transparency conduction layer and the second hollowed-out area is covered by the second transparency conduction layer, the increasing of impedance of the first metal layer and the second metal layer can be effectively avoided due to the existence of the first hollowed-out area and the second hollowed-out area, which not only is the width of the seal after formed normally detected, but also a constant impedance of the array substrate is ensured.

A further object of the present application is to provide a method for manufacturing a display panel, including the following steps:

performing a surface orientation treatment on the first substrate and the second substrate;

applying a seal and dropping liquid crystals on a surface of the first substrate or the second substrate;

bonding the first substrate and the second substrate, and then baking and curing thereof;

in which a method for manufacturing the first substrate includes the following steps:

forming a first metal layer on a glass substrate, and disposing a first hollowed-out area on the first metal layer;

forming a gate insulation layer on the first metal layer;

forming a second metal layer on the gate insulation layer, and disposing a second hollowed-out area on the second metal layer corresponding to the position of the first hollowed-out area;

forming a passivation layer on the second metal layer.

In an embodiment, before the step of forming a gate insulation layer on the first metal layer, the method further includes:

laying a first transparency conduction layer on a surface of the glass substrate corresponding to the first hollowed-out area;

performing masking on a surface of the first metal layer and a surface of the first transparency conduction layer.

In an embodiment, after the step of forming a second metal layer on the gate insulation layer, and disposing a second hollowed-out area on the second metal layer corresponding to the position of the first hollowed-out area; the method further includes:

laying a second transparency conduction layer on the second hollowed-out area corresponding to the gate insulation layer.

In an embodiment, after the step of forming a passivation layer on the second metal layer, the method further includes:

laying a second transparency conduction layer on a portion of the passivation layer corresponding to the second hollowed-out area;

disposing a contact hole communicating with the second metal layer on the passivation layer, and electrically connecting an edge of the second transparency conduction layer with the second metal layer via the contact hole.

In an embodiment, the step of applying the seal and dropping liquid crystals on the surface of the first substrate or the second substrate includes:

coating the surface of the first substrate with the seal, and a width of the seal is respectively smaller than a width of the first hollowed-out area and a width the second hollowed-out area; and dropping liquid crystals in the area enclosed by the seal.

In an embodiment, in the step of bonding the first substrate and the second substrate and then baking and curing thereof, the seal is bonded to the area respectively corresponding to the first hollowed-out area and the second hollowed-out.

In an embodiment, the surface orientation treatment includes the following steps:

respectively applying an orientation film on a surface of the first substrate and a surface of the second substrate; and curing the orientation film.

In an embodiment, the surface orientation treatment further includes the following steps:

rubbing the orientation film.

The method for manufacturing a display panel provided by the embodiment of the present application has the beneficial effects that the etching mask pattern of the first transparency conduction layer and the first metal layer can be completed in the same mask process, there is no need to be masked during laying the second transparency conduction layer, therefore no additional masking process is added, that is, there is no masking process is added when compared with traditional method for manufacturing the display panel, while in the manufacturing process of the display panel, the main cost is come from the masking process, that is, the production cost isn't substantially increased during the manufacturing of the display panel, but the detection accuracy to a width of the seal after formed is greatly improved, and the yield of the display panel is greatly improved.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
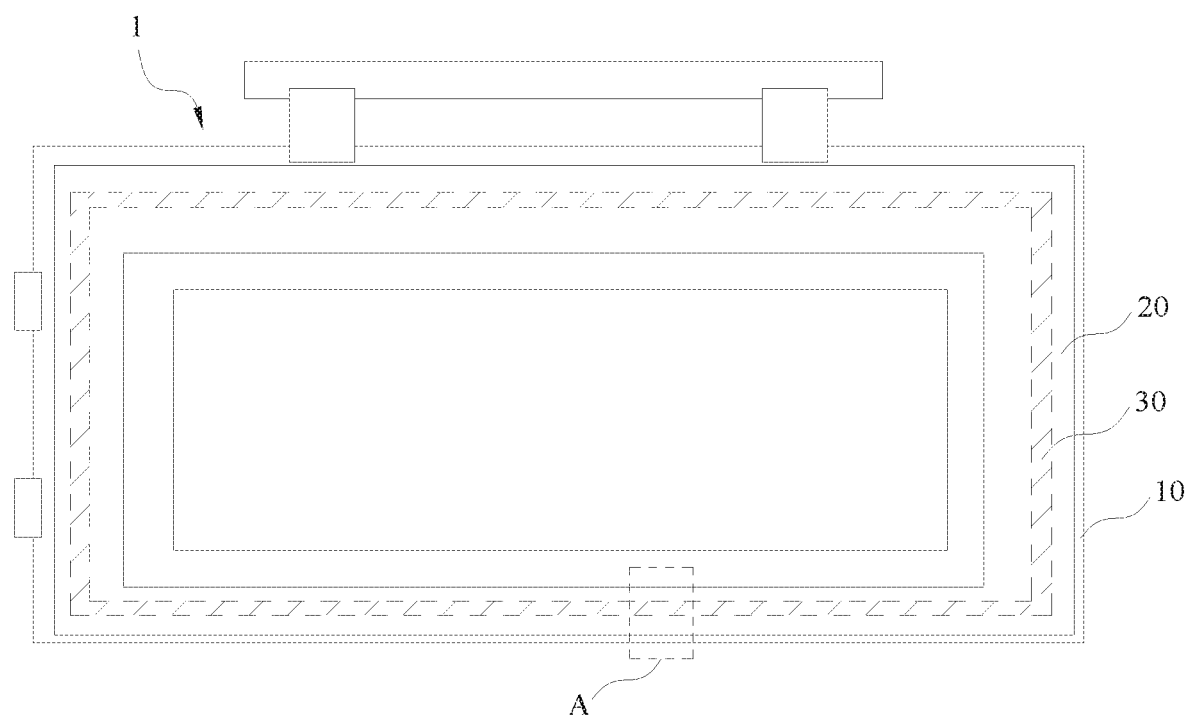
FIG. 1 is a perspective schematic view of a display panel provided in an embodiment of the present application.
Figure 2:
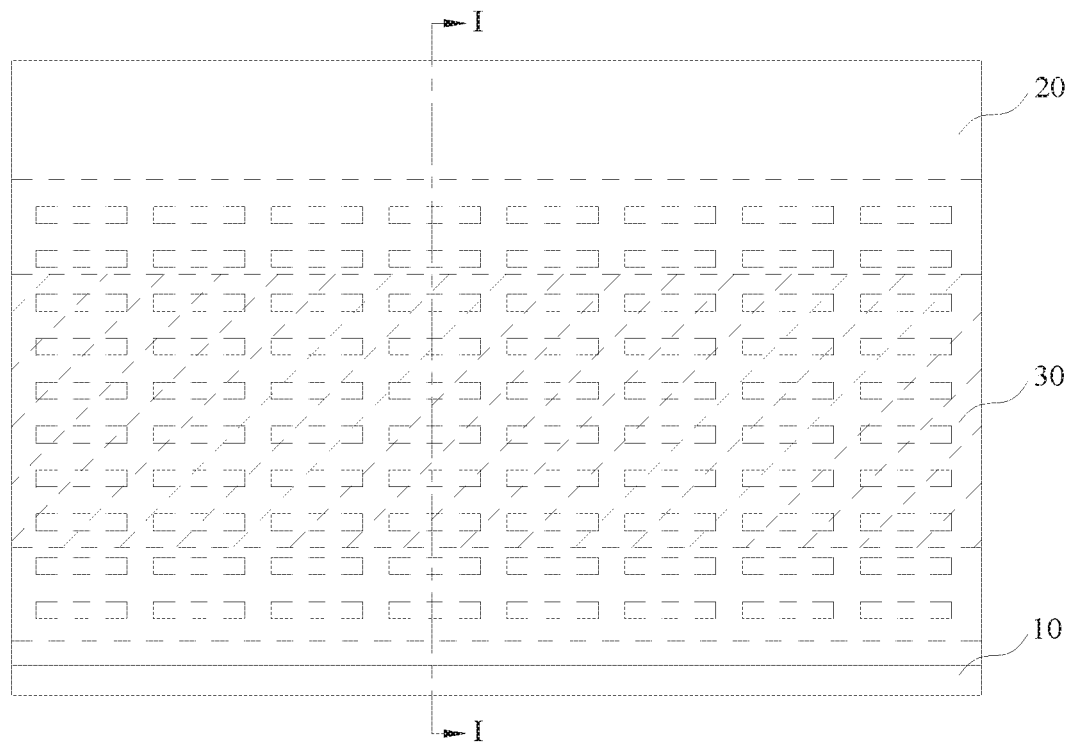
FIG. 2 is a partial enlarged perspective schematic view of a display panel in the existing.
Figure 3:
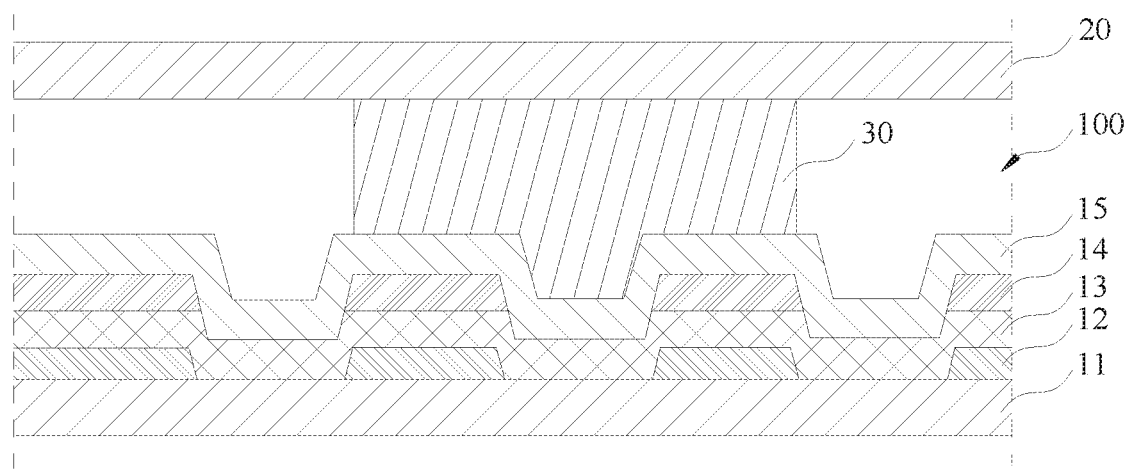
FIG. 3 is a cross-sectional view taken along direction of I-I in FIG. 2.

The reference numerals are listed and referred to as follows:

1—display panel; 10—first substrate; 20—second substrate; 30—seal; 11—glass substrate; 12—first metal layer; 13—gate insulation layer; 14—second metal layer; 15—passivation layer; 16—first transparency conduction layer; 17—second transparency conduction layer; 100—gap; 120—first hollowed-out area; 140—second hollowed-out area; 150—constract hole.

DESCRIPTION OF THE EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed at" another component, it can be directly or indirectly on another component. When a component is referred to as being "connected to" another component, it can be directly or indirectly connected to another component. Directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. Terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

The specific embodiments of the display panel and the display device provided by the embodiments of the present application are described in detail below with reference to the accompanying drawings, and the size and shape of each area in the drawings do not reflect the true proportions, and the purpose thereof is only to illustrate the content of the present application.

In one embodiment:

Please refer to FIGS. 1 to 5, the display panel 1 includes a first substrate 10, a second substrate 20 and a seal 30, in which, the first substrate 10 is optionally a first substrate, which includes a glass substrate 11, a first metal layer 12, a gate insulation layer 13, a second metal layer 14, and a passivation layer 15, and the second substrate 20 optionally a second substrate; the second substrate 20 is disposed opposite to the first substrate 10, and the second substrate 20 is spaced apart from the first substrate 10 to form a gap 100; the seal 30 is filled in the gap 100, and the first metal layer 12, the gate insulation layer 13, the second metal layer 14 and the passivation layer 15 are sequentially arranged from a side where the glass substrate 11 is located to a side where the gap 100 is located; the first metal layer is provided with a first hollowed-out area 120 herein, and the first hollowed-out area 120 is overlapped with a vertical projection area of the seal 30, that is, the first hollowed-out area 120 is overlapped with the vertical projection area directly under the seal 30 and configured for allowing a detection light to pass through; and the second metal layer 14 is provided with a second hollowed-out area 140, the second hollowed-out area 140 is overlapped with a vertical projection area of the seal 30, that is, the second hollowed-out area 140 is overlapped with a vertical projection area directly under the seal 30 and configured for allowing a detection light to pass through, and a width of the first hollowed-out area 120 and a width of the second hollowed-out area 140 are respectively greater than a width of the seal 30.

In the display panel 1 provided by the embodiment of the present application, the first metal layer 12 and the second metal layer 14 are respectively provided with a first hollowed-out area 120 and a second hollowed-out area 140, the detection light emitted by the detector can be smoothly passed through the array substrate to detect the boundary of the seal 30 when the width of the seal 30 needs to be detected, the width of the seal 30 can be accurately detected, and the technical problem that the width of the seal 30 cannot be accurately detected due to the affecting of the metal wires can be effectively solved, the accuracy of the detection of the seal is improved, and the yield of the display panel is ensured.

Figure 4:
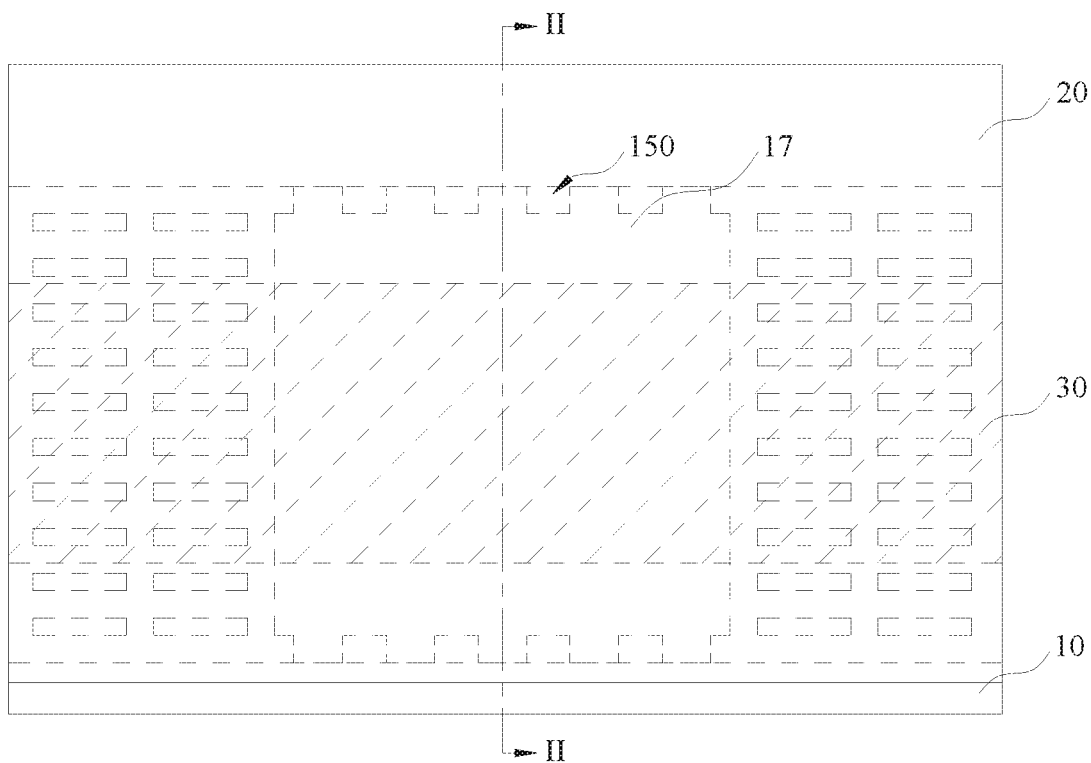
FIG. 4 is an enlarged perspective schematic view of a portion A in FIG. 1.
Figure 5:
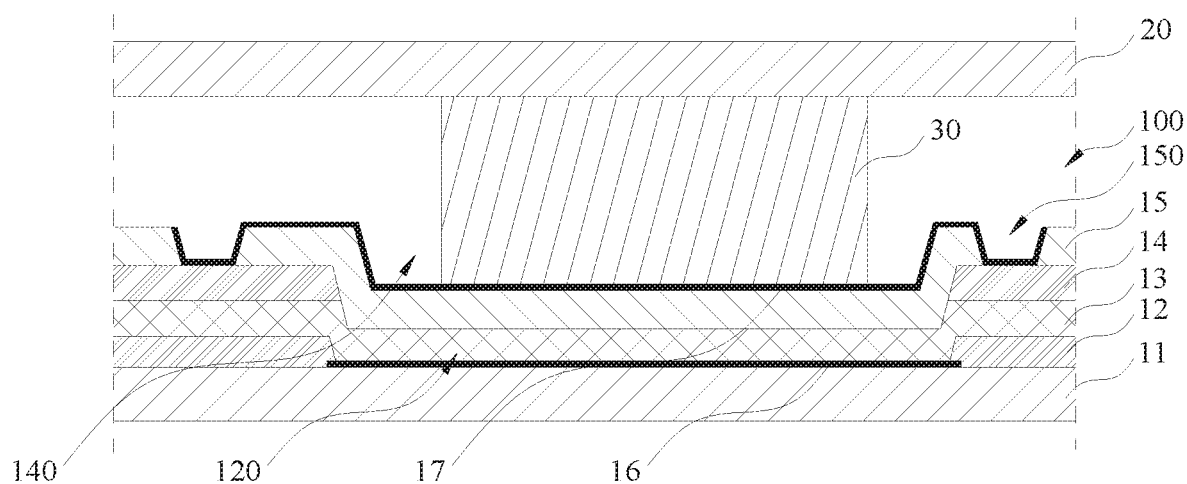
FIG. 5 is a cross-sectional view taken along direction of II-II in FIG. 4.

In another embodiment:

Please refer to FIG. 4 and FIG. 5, the display panel provided in this embodiment is substantially the same as that in the above embodiment, except that the first substrate 10 further includes a first transparency conduction layer 16 and a second transparency conduction layer 17, the first transparency conduction layer 16 and the second transparency conduction layer 17 are respectively select a thin film of ITO (Indium Tin Oxides), in which the first transparency conduction layer 16 is configured to connect with portions of the first metal layer 12 corresponding to opposite sides of the first hollowed-out area 120, therefore, the overall first metal layer 12 is conducted; and second transparency conduction layer 17 is configured to connect with portions of the second metal layer 14 corresponding to opposite sides of the second hollowed-out area 140, therefore, the overall second metal layer 14 is conducted; thereby the trace width of the common electrode, the scan line, the data line, and the like formed by the first metal layer 12 and the second metal layer 14 being narrowed can be avoided after direct removal of metals in the first hollowed-out area 120 and the second hollowed-out area 140, and the impedance of the first metal layer 12 and the second metal layer 14 being increased can be avoided.

Please refer to FIG. 5, in the embodiment, the first transparency conduction layer 16 is disposed between the glass substrate 11 and the gate insulation layer 13 and configured to cover the overall first hollowed-out area 120, since the first transparency conduction layer 16 is transparent and electrical conductive, not only cannot the detection light be blocked, but also the opposite side edges of the first hollowed-out area 120 can be conducted, and the impedance of the first metal layer 12 being increased can be effectively avoided due to the existence of the first hollowed-out area 120.

Please refer to FIG. 5, in the embodiment, the second transparency conduction layer 17 is disposed between the gate insulation layer 13 and the passivation layer 15 and configured to cover the overall second hollowed-out area 140, since the second transparency conduction layer 17 is transparent and electrical conductive, not only cannot the detection light be blocked, but also the opposite side edges of the second hollowed-out area 140 can be conducted, and the impedance of the second metal layer 14 being increased can be effectively avoided due to the existence of the second hollowed-out area 140.

In the embodiment, a thickness of the first transparency conduction layer 16 and a thickness of the second transparency conduction layer 17 are respectively 100 to 10000 angstroms (Å, the unit of measurement of the molecular diameter), the thickness value may be appropriately selected according to actual conditions and specific needs, which is not limited here.

In another embodiment:

Please refer to FIG. 4 and FIG. 5, the display panel provided in this embodiment is substantially the same as that in the second embodiment, except that the second transparency conduction layer 17 is disposed between a passivation layer 15 and the seal 30, in which the passivation layer 15 is provided with a contact hole 150, the contact hole 150 is located at a top side of opposite side edges of the second hollowed-out area 140 of the second metal layer 14 and configured for the second transparency conduction layer 17 to pass through, the second transparency conduction layer 17 is configured to form a pixel electrode of the first substrate 10 herein, and the opposite side edges of the second transparency conduction layer 17 respectively pass through the contract hole 150 to connect with the second metal layer 14. In this way, the second metal layer 14 is simultaneously conducted in the process of the pixel electrode, a laying region of the second transparency conduction layer 17 is not required to be photoetched on the gate insulation layer 13, the time is saved and production efficiency of the first substrate 10 is improved.

In further embodiment:

The present application is also provided a display device, including: the above display panel 1 and a backlight module, in which the backlight module is configured to provide illumination for the display panel 1.

The display device provided by the embodiment of the present application is adopted the display panel 1, the first hollowed-out area 120 is covered by the first transparency conduction layer 16 and the second hollowed-out area 140 is covered by the second transparency conduction layer 17, the increasing of impedance of the first metal layer 12 and the second metal layer 14 can be effectively avoided due to the existence of the first hollowed-out area 120 and the second hollowed-out area 140, not only is the width of the seal 30 after formed normally detected, but also a constant impedance of the first substrate 10 is ensured.

Figure 6:
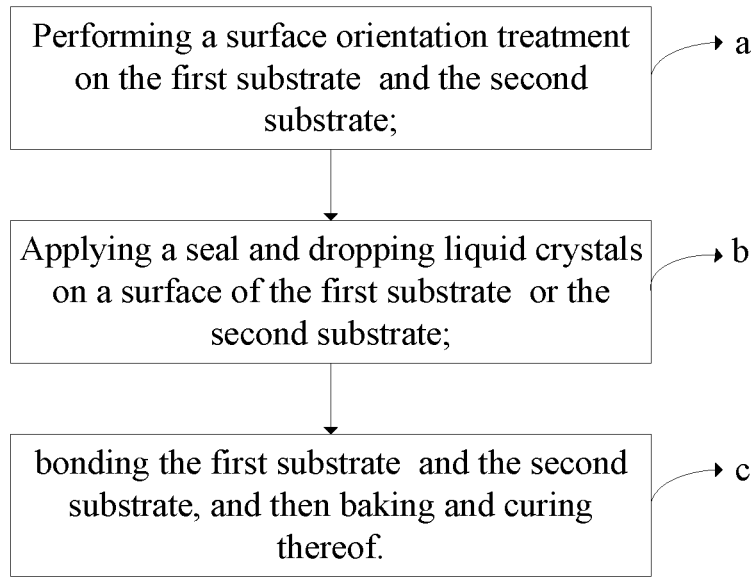
FIG. 6 is a process flow diagram of a method for manufacturing a display panel according to an embodiment of the present application.
Figure 7:
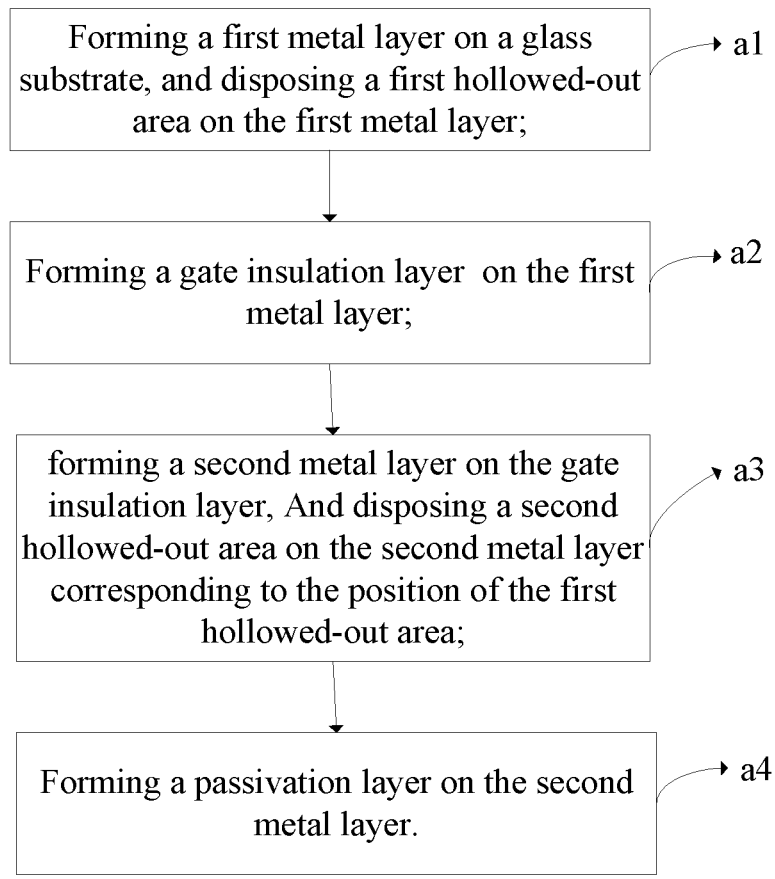
FIG. 7 is a process flow diagram of a method for manufacturing a first substrate according to an embodiment of the present application.

In further embodiment:

Please refer to FIG. 6 and FIG. 7, the present application is further provided a method for manufacturing a display panel, including the following steps:

a. performing a surface orientation treatment on the first substrate 10 and the second substrate 20;

b. applying a seal 30 and dropping liquid crystals on a surface of the first substrate 10 or the second substrate 20;

c. bonding the first substrate 10 and the second substrate 20, and then baking and curing thereof.

Specifically, in the process of forming the display panel 1, firstly, respectively applying an orientation film on a surface of the first substrate 10 and a surface of the second substrate 20, and a groove on the orientation film is configured to receive liquid crystals for the liquid crystal is oriented, then rubbing the orientation film cured with a friction wheel to increase the adhesion strength of the first substrate 10 and the second substrate 20, and then applying a seal 30 and dropping liquid crystals on the orientation film of the first substrate 10 or the orientation film of the second substrate 20, and then bonding a surface of the first substrate 10 having the orientation film with a surface of the second substrate 20 having the orientation film, afterwards baking and curing the first substrate 10 and the second substrate 20 bonded to be cured to form the display panel 1.

A method for manufacturing the first substrate includes the following steps:

a1, forming a first metal layer 12 on a glass substrate 11, and disposing a first hollowed-out area 120 on the first metal layer 12;

a2, forming a gate insulation layer 13 on the first metal layer 12;

a3, forming a second metal layer 14 on the gate insulation layer 13, and disposing a second hollowed-out area 140 on the second metal layer 14 corresponding to the position of the first hollowed-out area 120;

a4, forming a passivation layer 15 on the second metal layer 14.

It should be understood that the size of the sequence of the steps in the above embodiments does not mean the order of execution, and the order of execution of each process should be determined by its function and internal logic, and should not constitute any limited of implementation of the embodiments of the present application.

In the embodiment, before the step of forming a gate insulation layer 13 on the first metal layer 12, the method further includes: laying a first transparency conduction layer 16 on a surface of the glass substrate 11 corresponding to the first hollowed-out area 120; then performing masking on a surface of the first metal layer 12 and a surface of the first transparency conduction layer 16. Specifically, before the step of forming the gate insulation layer 13 on the first metal layer 12, firstly, laying the first transparency conduction layer 16 on the surface of the glass substrate 11 having the first metal layer 12, the first transparency conduction layer 16 is configured to cover the first hollowed-out area 120, and the first transparency conduction layer 16 is in contact with the first metal layer 12 to realize the conduction of the first metal layer 12, thereby the trace width of the common electrode, the scan line, the data line, and the like formed by the first metal layer 12 being narrowed can be avoided after direct removal of metal in the first hollowed-out area 120, and the impedance of the first metal layer 12 being increased can be avoided; and then photoetching a laying area of the gate insulation layer 13 on surfaces of the first metal layer 12 and the first transparency conduction layer 16 to prepare for forming the gate insulation layer 13.

In the embodiment, after the step of forming a second metal layer 14 on the gate insulation layer 13, and disposing a second hollowed-out area 140 on the second metal layer 14 corresponding to the position of the first hollowed-out area 120, the method further includes: laying a second transparency conduction layer 17 on the gate insulation layer 13 corresponding to the second hollowed-out area 140, that is, laying a second transparency conduction layer 17 on a surface of the gate insulation layer 13 away from the first transparency conduction layer 16, the second transparency conduction layer 17 is configured to cover the second hollowed-out area 140, and the second transparency conduction layer 17 is in contact with the second metal layer 14 to realize the conduction of the second metal layer 14, thereby the trace width of the common electrode, the scan line, the data line, and the like formed by the second metal layer 14 being narrowed can be avoided after direct removal of metal in the second hollowed-out area 140 and the second hollowed-out area 140, and the impedance of the second metal layer 14 being increased can be avoided.

In the embodiment, the step of applying the seal 30 and dropping liquid crystals on the surface of the first substrate 10 or the second substrate 20 includes: firstly, coating the surface of the first substrate 10 with the seal 30; then dropping liquid crystals on the area enclosed by the seal 30. Specifically, a width of the seal 30 is smaller than a width of the first hollowed-out area 120 and the second hollowed-out area 140, respectively, that is, the width of the seal 30 is smaller than the width of the first hollowed-out area 120 and smaller than the second hollowed-out area 140. In this way, the seal 30 can be ensured to adhere to the area corresponding to the first hollowed-out area 120 and the second hollowed-out area 140.

In the embodiment, in the step of bonding the first substrate 10 and the second substrate 20 and then baking and curing thereof, the seal 30 is bonded to the area corresponding to the first hollowed-out area 120 and the second hollowed-out area 140, therefore, the first metal layer 12 and the second metal layer 14 are prevented from blocking the detection light, and the width of the seal 30 after formed can be normally detected.

In the display panel manufacturing method provided by the present application, since the etching mask pattern of the first transparency conduction layer 16 and the first metal layer 12 can be completed in the same mask process, therefore no additional masking process is added, that is, there is no masking process is added when compared with traditional method for manufacturing a display panel 1, while in the manufacturing process of the display panel, the main cost is come from the masking process, that is, the production cost isn't substantially increased during the manufacturing of the display panel 1, but the detection accuracy to a width of the seal 30 after formed is greatly improved, and the yield of the display panel 1 is greatly improved.

In further embodiment:

The method of manufacturing the display panel provided by this embodiment is substantially the same as that of the above embodiment, except that the second transparency conduction layer 17 is completed after the step of forming the passivation layer 15 on the second metal layer 14, and the specific manufacturing step includes: laying a second transparency conduction layer 17 at a portion of the passivation layer 15 corresponding to the second hollowed area 140; disposing a contact hole 150 communicated with the second metal layer 14 on the passivation layer 15 to electrically connect the second metal layer 14 with an edge of the second transparency conduction layer 17 via the contact hole 150. The second transparency conduction layer 17 is configured to form a pixel electrode of the first substrate 10 herein, so that the second metal layer 14 is simultaneously conducted in the process of the pixel electrode, there is no need to photoetch the laying area of the transparency conduction layer 17 on the gate insulation layer 13, and the time is saved and the production efficiency of the first substrate 10 is improved.

The aforementioned embodiments are only optional embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A display panel, comprising:
    a first substrate;
    a second substrate, disposed opposite to the first substrate and spaced apart from the first substrate to form a gap; and
    a seal, filled in the gap;
    wherein the first substrate comprises:
    a glass substrate;
    a first metal layer, provided with a first hollowed-out area, and the first hollowed-out area is overlapped with a vertical projection area of the seal and configured for allowing a detection light to pass through;
    a gate insulation layer;
    a second metal layer, provided with a second hollowed-out area, and the second hollowed-out area is overlapped with a vertical projection area of the seal and configured for allowing a detection light to pass through, wherein a width of the first hollowed-out area and a width of the second hollowed-out area are respectively greater than a width of the seal;
    a passivation layer, the first metal layer, the gate insulation layer, the second metal layer, and the passivation layer are sequentially arranged from a side where the glass substrate is located to a side where the gap is located;
    a first transparency conduction layer, configured to directly connect with portions of the first metal layer corresponding to opposite sides of the first hollowed-out area; and
    a second transparency conduction layer, configured to directly connect with portions of the second metal layer corresponding to opposite sides of the second hollowed-out area;
    wherein the first transparency conduction layer is arranged between the glass substrate and the gate insulation layer, and an overlapped area between a portion of the first transparency conduction layer covering the first hollowed-out area and a portion of the second transparency conduction layer covering the second hollowed-out area in a plan view is also overlapped with the seal in the plan view.

2. The display panel of claim 1, wherein the second transparency conduction layer is arranged between the gate insulation layer and the passivation layer.

3. The display panel of claim 1, wherein the second transparency conduction layer is arranged between the passivation layer and the seal, the passivation layer is provided with a contact hole configured for allowing the second transparency conduction layer to pass through, and opposite side edges of the second transparency conduction layer respectively pass through the contract hole to connect with the second metal layer.

4. The display panel of claim 1, wherein the first transparency conduction layer and the second transparency conduction layer are respectively a nano-indium tin metal oxide thin film layer.

5. The display panel of claim 4, wherein a thickness of the first transparency conduction layer and a thickness of the second transparency conduction layer are respectively 100 to 10000 angstroms.

6. A display device, comprising:
a display panel;
a backlight module, configured to provide illumination for the display panel;
wherein the display panel comprises:
a first substrate;
a second substrate, disposed opposite to the first substrate and spaced apart from the first substrate to form a gap; and
a seal, filled in the gap;
wherein the first substrate comprises:
a glass substrate;
a first metal layer, provided with a first hollowed-out area, and the first hollowed-out area is overlapped with a vertical projection area of the seal and configured for allowing a detection light to pass through;
a gate insulation layer;
a second metal layer, provided with a second hollowed-out area, the second hollowed-out area is overlapped with a vertical projection area of the seal and configured for allowing a detection light to pass through, wherein a width of the first hollowed-out area and a width of the second hollowed-out area are respectively greater than a width of the seal;
a passivation layer, the first metal layer, the gate insulation layer, the second metal layer, and the passivation layer are sequentially arranged from a side where the glass substrate is located to a side where the gap is located;
a first transparency conduction layer, configured to directly connect with portions of the first metal layer corresponding to opposite sides of the first hollowed-out area; and
a second transparency conduction layer, configured to directly connect with portions of the second metal layer corresponding to opposite sides of the second hollowed-out area;
wherein the first transparency conduction layer is arranged between the glass substrate and the gate insulation layer, and an overlapped area between a portion of the first transparency conduction layer covering the first hollowed-out area and a portion of the second transparency conduction layer covering the second hollowed-out area in a plan view is also overlapped with the seal in the plan view.

7. The display device of claim 6, wherein the second transparency conduction layer is arranged between the gate insulation layer and the passivation layer.

8. The display device of claim 6, wherein the second transparency conduction layer is arranged between the passivation layer and the seal, the passivation layer is provided with a contact hole configured for allowing the second transparency conduction layer to pass through, and opposite side edges of the second transparency conduction layer respectively pass through the contract hole to connect with the second metal layer.

* * * * *